(12) United States Patent
Tang et al.

(10) Patent No.: US 11,616,724 B2
(45) Date of Patent: Mar. 28, 2023

(54) PACKET TRANSMISSION METHOD AND APPARATUS

(71) Applicant: HUAWEI TECHNOLOGIES CO., LTD., Guangdong (CN)

(72) Inventors: Penghe Tang, Nanjing (CN); Yonglong Fang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/821,452

(22) Filed: Mar. 17, 2020

(65) Prior Publication Data
US 2020/0304411 A1 Sep. 24, 2020

(30) Foreign Application Priority Data
Mar. 18, 2019 (CN) .......................... 201910203885.8

(51) Int. Cl.
*H04L 47/122* (2022.01)
*H04L 45/00* (2022.01)

(52) U.S. Cl.
CPC ............ *H04L 47/122* (2013.01); *H04L 45/22* (2013.01)

(58) Field of Classification Search
CPC ......... H04L 45/00; H04L 47/26; H04L 45/22; H04L 12/803; H04L 12/707
See application file for complete search history.

(56) References Cited

U.S. PATENT DOCUMENTS

| | | | | |
|---|---|---|---|---|
| 6,680,943 B1 * | 1/2004 | Gibson | .................. | H04L 29/06 370/392 |
| 7,298,693 B1 * | 11/2007 | Owens | .................... | H04L 45/22 370/227 |

(Continued)

FOREIGN PATENT DOCUMENTS

| | | |
|---|---|---|
| CN | 101483558 B | 7/2012 |
| CN | 102571543 A | 7/2012 |

(Continued)

OTHER PUBLICATIONS

XP000313881 IBM ,"Reverse Path Accumulation",IBM Technical Disclosure Bulletin, International Business Machines Corp. (Thornwood), US,vol. 35, No. 4B, Sep. 1, 1992 (Sep. 1, 1992),pp. 128-129.

*Primary Examiner* — Jonathan A Bui
*Assistant Examiner* — Kidest Mendaye
(74) *Attorney, Agent, or Firm* — Leydig, Voit & Mayer, Ltd.

(57) ABSTRACT

The method includes: receiving, by a first device, a first packet from a second device, where the first packet includes a primary scheduling identifier, and the primary scheduling identifier is used to identify that the second device has permission to select a path; determining, by the first device, a first path used to transmit the first packet; sending, by the first device, a second packet to the second device by using the first path, where the second packet includes a following identifier, and the following identifier is used to identify that the first device sends the packet by using a transmission path selected by a device other than the first device. This can ensure that a same path is used for bidirectional packet transmission between two communication parties while ensuring service quality, in a complex SD-WAN path selection scenario.

10 Claims, 9 Drawing Sheets

(56) References Cited

U.S. PATENT DOCUMENTS

| | | | | |
|---|---|---|---|---|
| 7,315,510 | B1* | 1/2008 | Owens | H04L 45/22 370/395.5 |
| 7,706,255 | B1* | 4/2010 | Kondrat | H04L 47/263 370/219 |
| 8,693,323 | B1* | 4/2014 | McDysan | H04L 45/50 370/230 |
| 2015/0312139 | A1* | 10/2015 | Li | H04L 41/0813 370/351 |
| 2015/0381473 | A1* | 12/2015 | Murakami | H04L 45/22 370/351 |
| 2018/0375744 | A1* | 12/2018 | Mayya | H04L 47/22 |
| 2019/0058659 | A1* | 2/2019 | Tjahjono | H04L 45/741 |
| 2019/0140949 | A1 | 5/2019 | Wu et al. | |
| 2019/0173776 | A1* | 6/2019 | Levy | H04L 47/122 |
| 2020/0204479 | A1* | 6/2020 | Filsfils | H04L 45/74 |

FOREIGN PATENT DOCUMENTS

| | | |
|---|---|---|
| CN | 107786437 A | 3/2018 |
| CN | 108667729 A | 10/2018 |
| JP | 2004248085 A | 9/2004 |
| JP | 2004343213 A | 12/2004 |
| JP | 2005354579 A | 12/2005 |
| JP | 2016012896 A | 1/2016 |

\* cited by examiner

PACKET TRANSMISSION METHOD AND APPARATUS

CROSS-REFERENCE TO RELATED APPLICATION

This application claims priority to Chinese Patent Application No. 201910203885.8, filed on Mar. 18, 2019, which is hereby incorporated by reference in its entirety.

TECHNICAL FIELD

The present application relates to the field of communications technologies, and in particular, to a packet transmission method and apparatus.

BACKGROUND

A software-defined networking in a wide area network (SD-WAN) is a new technology generated based on application of a software-defined networking (SDN) technology in a wide area network (WAN). The wide area network is mainly used to connect several branch offices and a data center that are included in an enterprise network. The SD-WAN supports a plurality of connection manners, for example, a multi-protocol label switching (MPLS) network connection, an internet (Internet) connection, and an MPLS-and-internet hybrid connection (also referred to as a hybrid-link). In the SD-WAN, a client serving as a communication subject is connected to a site serving as an access device. The site is used to forward a bearer service flow packet for the client connected to the site. In a packet forwarding process, sites need to select transmission paths for service flows of two communication parties. To improve user experience and implement load balancing, two sites to which clients of two communication parties are respectively connected need to ensure that a same transmission path is selected for the two communication parties, that is, ensure that selected transmission paths are the same.

In an existing solution, an SDN controller configures a same path selection policy for a plurality of sites. For example, the path selection policy includes a correspondence between identifiers of clients serving as two communication parties and paths, so that two sites connected to the two communication parties can select a same path, and a path selection result of a first packet transmitted between the two communication parties is used to transmit a subsequent packet. A communications system shown in FIG. 1 includes a site 1 and a site 2. The site 1 is connected to a client whose IP address is 10.10.10.10 and a client whose IP address is 10.10.11.11, and the site 2 is connected to a client whose IP address is 10.10.20.20 and a client whose IP address is 10.10.21.21. Each of the site 1 and the site 2 stores a policy 1 and a policy 2. The policy 1 specifies that an MPLS link is preferentially selected for a flow between the IP address 10.10.10.10 and the IP address 10.10.20.20. The policy 2 specifies that an internet link is preferentially selected for a flow between the IP address 10.10.11.11 and the IP address 10.10.21.21. If the client whose IP address is 10.10.10.10 communicates with the client whose IP address is 10.10.20.20, the site 1 and the site 2 both select the policy 1, that is, both select an MPLS link for packet transmission. This avoids a problem that the site 1 and the site 2 select different paths. However, this solution applies to only simple path selection scenarios between the site 1 and the site 2. The simple path selection scenarios include but are not limited to a simple path scenario and a simple policy scenario. In addition to simple path selection, a complex path selection solution may be required in other scenarios, for example, original path quality does not meet a requirement, there is a time difference between quality detection periods and policy refresh periods of the two sites, a path/paths of at least one of the two sites is/are congested, and service priorities need to be sorted. The foregoing scenarios are also referred to as complex path selection scenarios. In the complex path selection scenarios, in the prior art, it is difficult to ensure that paths reselected by the site 1 and the site 2 according to the path selection policy are the same. As a result, paths selected by the site 1 and the site 2 may be different.

In another existing solution, the site 1 and the site 2 separately record a path selection result of the first packet transmitted between the site 1 and the site 2. For example, the first packet is sent by the site 1, and subsequent packets sent by the site 1 and the site 2 are subject to the path selection result of the first packet. If a path needs to be changed, the site 1 is always responsible for path selection. However, if a link fault, path congestion, or the like occurs during communication between the two sites, only when a site that fails to send a packet does not receive a response packet after timeout can the site know that the packet fails to be sent. Then, path reselection is triggered. If the site that fails to send the packet is the site 2, the site 1 needs to reselect a path, so that the site 2 can continue to send the packet. This causes a serious service delay.

In an SD-WAN path selection scenario, whether a site selects a simple path selection solution or a complex path selection solution usually depends on an application to which a packet belongs. To sum up, further in-depth research is still required to ensure that a same path is used for bidirectional packet transmission between two communication parties while ensuring service quality in the complex SD-WAN path selection scenario.

SUMMARY

This application provides a packet transmission method and apparatus, to ensure that a same path is used for bidirectional packet transmission between two communication parties while ensuring service quality in a complex SD-WAN path selection scenario.

According to a first aspect, an embodiment of this application provides a packet transmission method. The method includes: receiving, by a first device, a first packet from a second device, where the first packet includes a primary scheduling identifier, and the primary scheduling identifier is used to identify that the second device has permission to select a path; determining, by the first device, a first path used to transmit the first packet; and sending, by the first device, a second packet to the second device by using the first path, where the second packet includes a following identifier, and the following identifier is used to identify that the first device sends the packet by using a transmission path selected by a device other than the first device.

Based on the solution, the second device serving as a primary scheduling party has the permission to select a path, and the first device serving as a following party may send the packet by using the transmission path selected by the device other than the first device. To be specific, when the second device communicates with the first device, the first device serving as the following party may send the packet by using the transmission path selected by the second device serving as the primary scheduling party, so that the first device and the second device send the packets by using the same transmission path. This can ensure that a same path is used for bidirectional packet transmission between two communication parties while ensuring service quality, even in a complex SD-WAN path selection scenario.

In a possible design, the first packet may further include a path version identifier, and the path version identifier is used to identify whether a path selected by a packet transmit end changes; and after the sending, by the first device, a second packet to the second device by using the first path, the method further includes: receiving, by the first device, a third packet from the second device, where the third packet includes the primary scheduling identifier and a path version identifier; if the first device determines that the path version identifier carried in the third packet is different from the path version identifier carried in the first packet, determining a second path used to transmit the third packet; and sending, by the first device, a fourth packet to the second device by using the second path, where the fourth packet includes the following identifier.

According to this design, the first device serving as the following party receives the third packet from the second device after receiving the first packet from the second device. A transmission path used for the first packet is the transmission path selected by the second device when the second device transmits the first packet, and a transmission path used for the third packet is a transmission path selected by the second device when the second device transmits the third packet. Therefore, whether the path selected by the second device serving as the primary scheduling party changes can be learned by comparing the transmission path used for the first packet with the transmission path used for the third packet. In this design, by determining, through comparison, whether the path version identifiers respectively carried in the first packet and the third packet are the same, the first device can quickly determine whether the transmission path selected by the second device changes. If the path version identifiers respectively carried in the first packet and the third packet are different, it may indicate that the second device has reselected a path when sending the third packet. In this case, the first device serving as the following party also uses the new path selected by the second device, to send the packet. In this way, when the second device serving as the primary scheduling party changes the transmission path, it can still be ensured that a same path is used for bidirectional packet transmission between the two communication parties.

In a possible design, manners in which the first device determines the first path used to transmit the first packet may include but are not limited to the following manners: The first device obtains the first path through parsing from the first packet; or the first device determines, based on a first correspondence and an interface identifier that is used to receive the first packet, path information corresponding to the interface identifier that is used to receive the first packet, and uses a path corresponding to the determined path information as the first path used to transmit the first packet, where the first correspondence includes a correspondence between the interface identifier and the path information.

In a possible design, the second packet may further include a backward congestion back pressure identifier; and after receiving the first packet from the second device, the first device may further determine whether a path in a receiving direction of the first device is congested, and if the path in the receiving direction of the first device is congested, set the backward congestion back pressure identifier included in the second packet to a first value, or if the path in the receiving direction of the first device is not congested, set the backward congestion back pressure identifier included in the second packet to a second value.

According to this design, the first device adds the backward congestion back pressure identifier to the sent second packet, so that the first device can notify, in a timely manner, the second device whether the receiving direction of the first device is congested.

In a possible design, the second packet may further include a forward congestion back pressure identifier. Before the first device sends the second packet to the second device by using the first path, the first device may further determine whether a path in a sending direction of the first device is congested, and if the path in the sending direction of the first device is congested, set the forward congestion back pressure identifier included in the second packet to the first value, or if the path in the sending direction of the first device is not congested, set the forward congestion back pressure identifier included in the second packet to the second value.

According to this design, the first device adds the forward congestion back pressure identifier to the sent second packet, so that the first device can notify, in a timely manner, the second device whether the sending direction of the first device is congested.

It should be understood that any packet transmitted between the first device and the second device may carry either or both of the backward congestion back pressure identifier and the forward congestion back pressure identifier. In specific implementation, whether to carry the two identifiers depends on a specific situation, and is not limited herein.

According to a second aspect, an embodiment of this application provides a packet transmission method. The method includes: receiving, by a first device, a first packet from a second device, where the first packet includes a following identifier, and the following identifier is used to identify that the second device sends the packet by using a transmission path selected by a device other than the second device; determining, by the first device based on a path selection policy, a first path used to send a second packet; and sending, by the first device, the second packet to the second device by using the first path, where the second packet includes a primary scheduling identifier, and the primary scheduling identifier is used to identify that the first device has permission to select a path.

Based on the solution, the first device serving as a primary scheduling party has the permission to select a path, and the second device serving as a following party may send the packet by using the transmission path selected by the device other than the second device. When the first device receives the first packet from the second device, the first device selects, according to the path selection policy, a transmission path to send the second packet, instead of sending the second packet by using the transmission path used for the first packet. To be specific, when the second device communicates with the first device, the first device serving as the primary scheduling party sends the packet by using the transmission path selected by the first device, and the second device serving as the following party may send a packet by using the transmission path selected by the first device serving as the primary scheduling party, so that the first device and the second device send the packets by using the same transmission path. In this way, even in a complex SD-WAN path selection scenario, it can still be ensured that a same path is used for bidirectional packet transmission between two communication parties while service quality is ensured.

In a possible design, after the sending, by the first device, the second packet to the second device by using the first path, the method further includes: receiving, by the first device, a third packet from the second device, where the third packet includes the following identifier, and a transmission path of the third packet is the first path.

According to this design, the first device serving as the primary scheduling party sends the second packet by using the first path. After receiving the second packet that carries the primary scheduling identifier, the second device serving as the following party also uses the first path to send a next packet. To be specific, the second device serving as the following party sends the packet by using the transmission path selected by the first device serving as the primary scheduling party. This can effectively ensure that a same path is used for bidirectional packet transmission between two communication parties.

In a possible design, the first packet further includes a forward congestion back pressure identifier and/or a backward congestion back pressure identifier; and after the first device determines, based on the path selection policy, the first path used to send the second packet, the method further includes: if it is determined that the first packet meets a preset condition, and neither a path in a receiving direction of the first device nor a path in a sending direction of the first device is congested, waiving, by the first device, the permission to select a path, where the preset condition includes: the forward congestion back pressure identifier included in the first packet is a first value, and/or the backward congestion back pressure identifier included in the first packet is the first value, where the first value is used to indicate that congestion occurs; and sending, by the first device, a fourth packet to the second device by using the first path, where the fourth packet includes the following identifier, both a forward congestion back pressure identifier and a backward congestion back pressure identifier carried in the fourth packet are a second value, and the second value is used to indicate that no congestion occurs.

According to this design, after the first device serving as the primary scheduling party receives the first packet from the second device, if the first packet includes the forward congestion back pressure identifier, the first device may determine, based on a value of the forward congestion back pressure identifier included in the first packet, whether a path in a sending direction of the second device is congested; and/or if the first packet includes the backward congestion back pressure identifier, the first device may determine, based on a value of the backward congestion back pressure identifier included in the first packet, whether a path in a receiving direction of the second device is congested. Further, when neither the path in the receiving direction of the first device nor the path in the sending direction of the first device is congested, and a path in at least one direction of the second device is congested, the first device waives the permission to select a path, and notifies the second device by adding the following identifier to the subsequently sent fourth packet, so that the second device can learn that the first device has waived the permission to select a path, and the second device can obtain the permission to select a path. In this way, the second device whose path is congested can select a path to transmit a packet, so that continuous congestion can be avoided for the second device.

In a possible design, after the sending, by the first device, a fourth packet to the second device by using the first path, the method further includes: receiving, by the first device, a fifth packet from the second device, where the fifth packet includes a primary scheduling identifier, and a transmission path of the fifth packet is a fourth path selected by the second device according to the path selection policy.

According to this design, after the first device waives the permission to select a path, the second device can serve as a primary scheduling party to select a transmission path according to the path selection policy. The second device adds the primary scheduling identifier to the fifth packet to notify the first device that the second device becomes the primary scheduling party, that is, the second device has the permission to select a path. Correspondingly, the first device may serve as a following party to send a packet by using the transmission path selected by the second device. In this way, the second device whose path is congested selects the transmission path, so that continuous congestion can be avoided for the second device.

In a possible design, the first packet and the second packet each further include a path version identifier, and the path version identifier is used to identify whether a path selected by a packet transmit end changes; and after the receiving, by a first device, a first packet from a second device, and before the determining, by the first device based on a path selection policy, a first path used to send a second packet, the method further includes: if the first device determines to reselect a transmission path used to send the packet, setting a path version identifier included in the second packet to a third value, where the third value is used to indicate that the path selected by the first device changes; or if the first device determines not to change a transmission path used to send the packet, setting a path version identifier included in the second packet to a fourth value, where the fourth value is used to indicate that the path selected by the first device does not change.

According to this design, after sending the first packet, if the first device serving as the primary scheduling party needs to reselect a transmission path used to send the packet, the first device may add, to the second packet, a path version identifier whose value is different from a value corresponding to the first packet, so that the second device can learn, in a timely manner, that the transmission path selected by the first device changes; or may add, to the second packet, a path version identifier whose value is the same as a value corresponding to the first packet, so that the second device can learn, in a timely manner, that the transmission path selected by the first device does not change.

In a possible design, before receiving the first packet from the second device, the first device may further receive a primary-secondary selection policy delivered by a controller, and the first device determines, based on the primary-secondary selection policy, whether the first device has the permission to select a path. The primary-secondary selection policy includes but is not limited to one or more of the following policies: a device, in the first device and the second device, with a smaller link bandwidth has the permission to select a path; in the first device and the second device, a device serving as a branch router spoke has the permission to select a path, and a device serving as a hub has permission to follow the path selected by the device serving as the spoke; a correspondence between an identifier of the first device and scheduling permission and a correspondence between an identifier of the second device and scheduling permission; and a correspondence between a system IP address of the first device and scheduling permission and a correspondence between a system IP address of the second device and scheduling permission.

According to this design, when the first device communicates with the second device, the first device can effectively determine, in a plurality of scenarios, whether scheduling permission of each of the two communication parties is a primary scheduling party or a following party.

According to a third aspect, an embodiment of this application provides a packet transmission apparatus. The apparatus has a function of implementing the first device in any one of the first aspect or the possible designs of the first aspect. The function may be implemented by hardware, or may be implemented by hardware by executing corresponding software. The hardware or the software includes one or more modules corresponding to the function.

In a possible design, a structure of the apparatus includes a processing module and a transceiver module. The processing module is configured to support the apparatus in performing corresponding method steps in any one of the first aspect or the designs of the first aspect. The transceiver module is configured to support communication between the apparatus and another communications device. The apparatus may further include a storage module. The storage module is coupled to the processing module, and stores a program instruction and data that are necessary for the apparatus. In an example, the processing module may be a processor, a transceiver module may be a transceiver or a communications interface, and the storage module may be a memory.

According to a fourth aspect, an embodiment of this application provides a computer-readable storage medium. The computer storage medium stores a computer-readable instruction, and when a computer reads and executes the computer-readable instruction, the computer is enabled to perform the method according to any one of the first aspect or the possible designs of the first aspect.

According to a fifth aspect, an embodiment of this application provides a computer program product, and when a computer reads and executes the computer program product, the computer is enabled to perform the method according to any one of the first aspect or the possible designs of the first aspect.

According to a sixth aspect, an embodiment of this application provides a chip. The chip is connected to a memory, and is configured to read and execute a software program stored in the memory, to implement the method according to any one of the first aspect or the possible designs of the first aspect.

According to a seventh aspect, an embodiment of this application provides a packet transmission apparatus. The apparatus has a function of implementing the first device according to any one of the second aspect or the possible designs of the second aspect. The function may be implemented by hardware, or may be implemented by hardware by executing corresponding software. The hardware or the software includes one or more modules corresponding to the function.

In a possible design, a structure of the apparatus includes a processing module and a transceiver module. The processing module is configured to support the apparatus in performing corresponding method steps in any one of the second aspect or the designs of the second aspect. The transceiver module is configured to support communication between the apparatus and another communications device. The apparatus may further include a storage module. The storage module is coupled to the processing module, and stores a program instruction and data that are necessary for the apparatus. In an example, the processing module may be a processor, a communications module may be a transceiver or a communications interface, and the storage module may be a memory.

According to an eighth aspect, an embodiment of this application provides a computer-readable storage medium. The computer storage medium stores a computer-readable instruction, and when a computer reads and executes the computer-readable instruction, the computer is enabled to perform the method according to any one of the second aspect or the possible designs of the second aspect.

According to a ninth aspect, an embodiment of this application provides a computer program product, and when a computer reads and executes the computer program product, the computer is enabled to perform the method according to any one of the second aspect or the possible designs of the second aspect.

According to a tenth aspect, an embodiment of this application provides a chip. The chip is connected to a memory, and is configured to read and execute a software program stored in the memory, to implement the method according to any one of the second aspect or the possible designs of the second aspect.

According to an eleventh aspect, an embodiment of this application provides a communications system. The communications system includes a first site device and a second site device. The first site device may be configured to perform the method performed by the first device according to any one of the first aspect or the possible designs of the first aspect, and the second site device may be configured to perform the method performed by the first device according to any one of the second aspect or the possible designs of the second aspect.

DESCRIPTION OF EMBODIMENTS

In descriptions of this application, unless otherwise stated, "a plurality of" means two or more than two. In the descriptions of this application, terms such as "first" and "second" are merely used for distinction and description, and shall not be understood as an indication or implication of relative importance or an indication or implication of an order.

Figure 1:
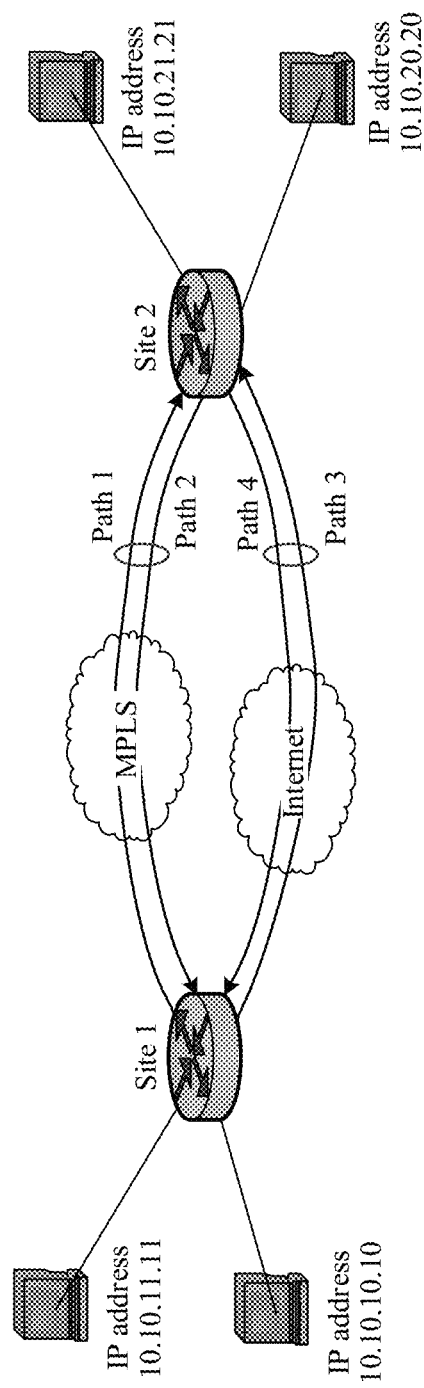
FIG. 1 is a schematic diagram of a path in a simple scenario.
Figure 2:
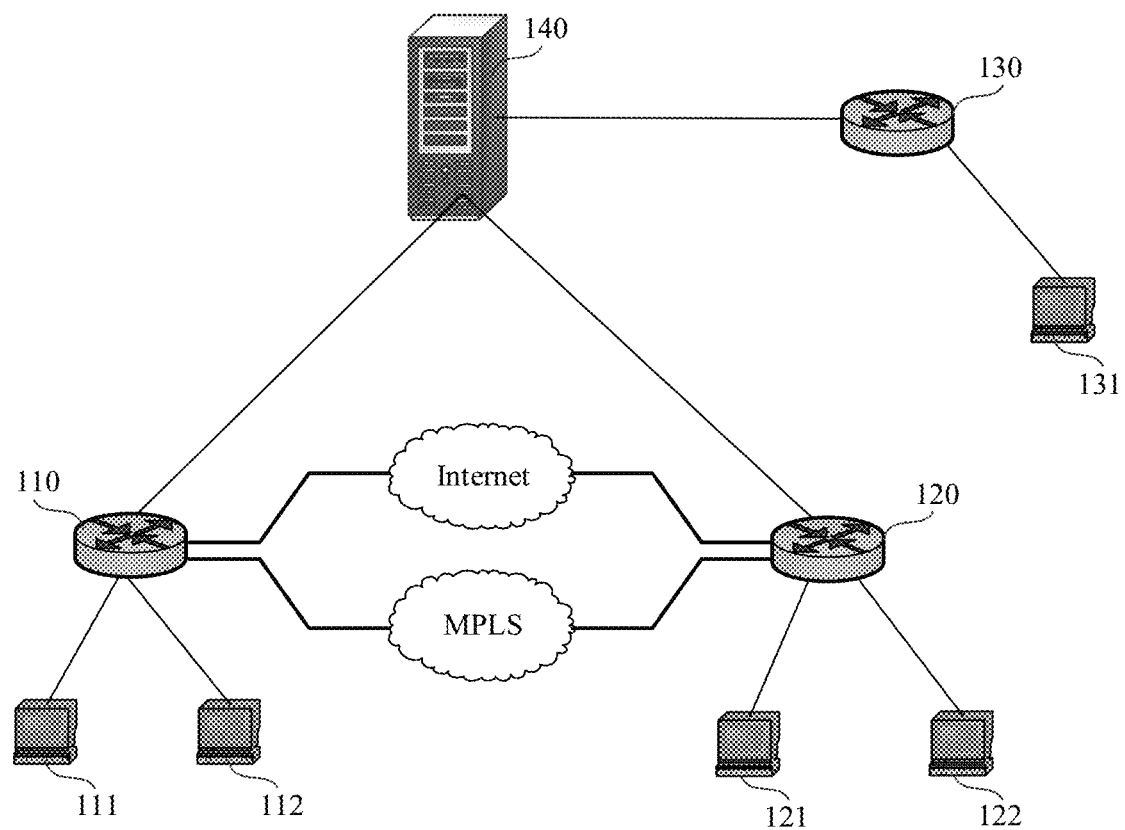
FIG. 2 is a possible schematic diagram of a network architecture according to an embodiment of this application.

FIG. 2 is a schematic diagram of a communications system architecture to which an embodiment of this application is applicable. The communications system architecture includes a plurality of devices (which may also be referred to as sites) and a plurality of clients, for example, a device 110, a device 120, and a device 130 shown in FIG. 2. Any two of the device 110, the device 120, and the device 130 may be connected. FIG. 2 shows, merely as an example, a connection relationship between the device 110 and the device 120.

Each of the device 110, the device 120, and the device 130 may be connected to one or more clients. FIG. 2 shows, merely as an example, a client 111 and a client 112 that are connected to the device 110, a client 121 and a client 122 that are connected to the device 120, and a client 131 that is connected to the device 130.

When packets are transmitted between two clients serving as two communication parties, the packets need to be forwarded by devices respectively connected to the clients serving as the two communication parties. Using an example in which the two communication parties are the client 111 and the client 121, when the client 111 needs to send a packet A to the client 121, a path along which the packet A is transmitted is: the client 111->the device 110->the device 120->the client 121, and when the client 121 needs to send a packet B to the client 111, a path along which the packet B is transmitted is: the client 121->the device 120->the device 110->the client 111.

Figure 3:
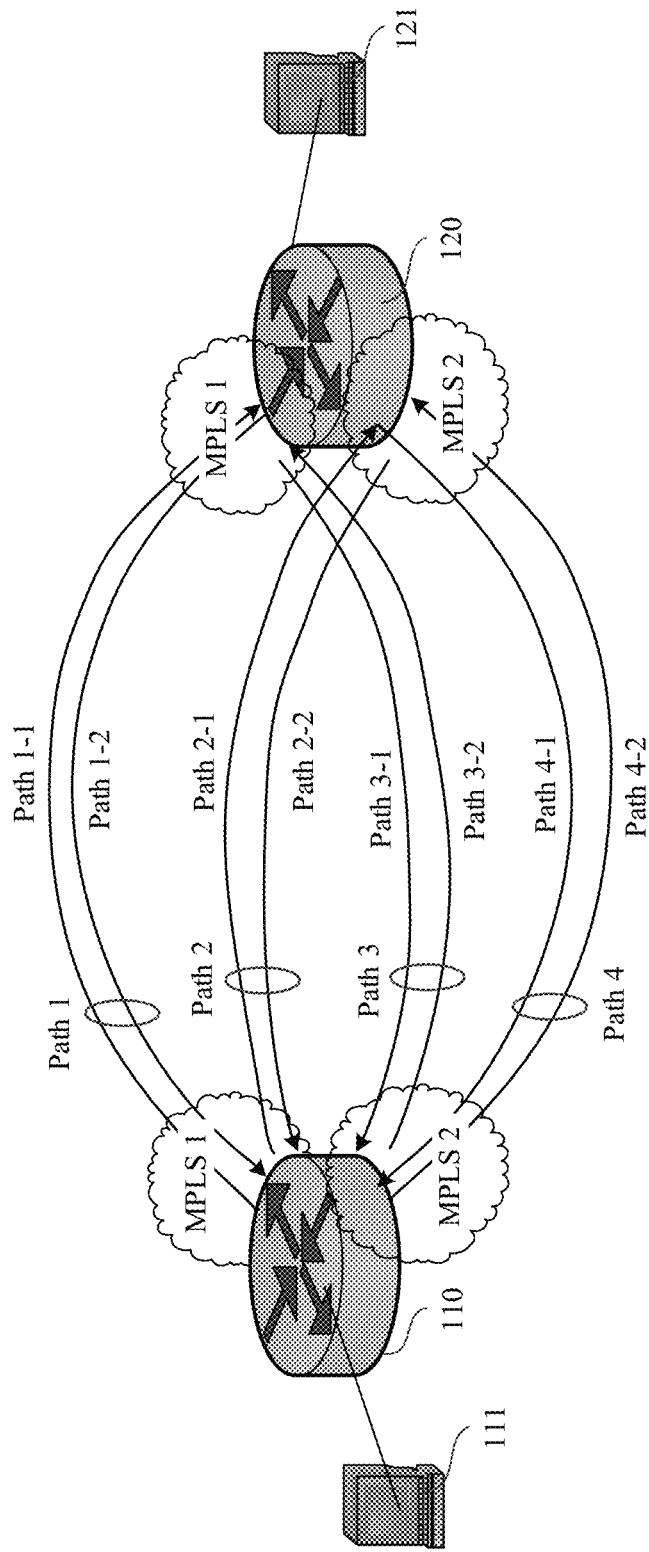
FIG. 3 is a schematic diagram of a path in a complex scenario to which an embodiment of this application is applicable.

There may be a plurality of transmission paths between the device 110 and the device 120. An example in which there are an MPLS 1 link and an MPLS 2 link between the device 110 and the device 120 is used. As shown in FIG. 3, there are four paths between a device 110 and a device 120. A path 1 includes a path 1-1 and a path 1-2 that are in opposite directions, where the path 1-1 is in a direction from an interface that is in the device 110 and that is connected to MPLS 1 to an interface that is in the device 120 and that is connected to MPLS 1, and the path 1-2 is in a direction from the interface that is in the device 120 and that is connected to MPLS 1 to the interface that is in the device 110 and that is connected to MPLS 1. A path 2 includes a path 2-1 and a path 2-2 that are in opposite directions, where the path 2-1 is in a direction from the interface that is in the device 110 and that is connected to MPLS 1 to an interface that is in the device 120 and that is connected to MPLS 2. A path 3 includes a path 3-1 and a path 3-2 that are in opposite directions, where the path 3-1 is in a direction from an interface that is in the device 110 and that is connected to MPLS 2 to the interface that is in the device 120 and that is connected to MPLS 1. A path 4 includes a path 4-1 and a path 4-2 that are in opposite directions, where the path 4-1 is in a direction from the interface that is in the device 110 and that is connected to MPLS 2 to the interface that is in the device 120 and that is connected to MPLS 2.

From a perspective of the device 110, a path selection policy is that a path selection sequence is the path 1->the path 2->the path 3->the path 4. From a perspective of the device 120, a path selection policy is that a path selection sequence is the path 1->the path 3->the path 2->the path 4. When packets are transmitted between the device 110 and the device 120, the device 110 preferentially selects the path 1 to send a packet, and the device 120 also preferentially selects the path 1 to send a packet. If quality of the path 1 does not meet a requirement in some cases, the device 110 selects the path 2 to send the packet, and the device 120 selects the path 3 to send the packet. As a result, the device 110 and the device 120 transmit the packets to each other by using different paths.

In addition to a problem that the device 110 and the device 120 may send packets to each other by using different paths in the scenario shown in FIG. 3, in many complex SD-WAN path selection scenarios, it is also difficult to ensure that a same path is used for bidirectional packet transmission between two communication parties.

To ensure that a same path is used for bidirectional packet transmission between two communication parties while ensuring service quality in a complex SD-WAN path selection scenario, embodiments of this application provide a packet transmission method. Devices connected to the two communication parties are a primary scheduling party and a following party, where a device serving as the primary scheduling party has permission to select a path, and a device serving as the following party sends a packet by using a path selected by the device serving as the primary scheduling party.

In specific implementation, the device 110 may serve as the primary scheduling party, or may serve as a secondary scheduling party (that is, the following party). For example, when the device 110 communicates with the device 120, the device 110 serves as the primary scheduling party, and the device 120 serves as the following party. For a specific communication process, refer to the following method procedure shown in FIG. 5. For another example, when the device 110 communicates with the device 130, the device 130 serves as the primary scheduling party, and the device 110 serves as the following party. For a specific communication process, refer to the method procedure shown in FIG. 8.

In FIG. 2, the communications system architecture further includes a controller 140. The controller 140 is separately connected to the device 110, the device 120, and the device 130. The controller 140 may deliver various types of policy information, including but not limited to a path selection policy and a primary-secondary selection policy, to the device 110, the device 120, and the device 130.

Figure 4:
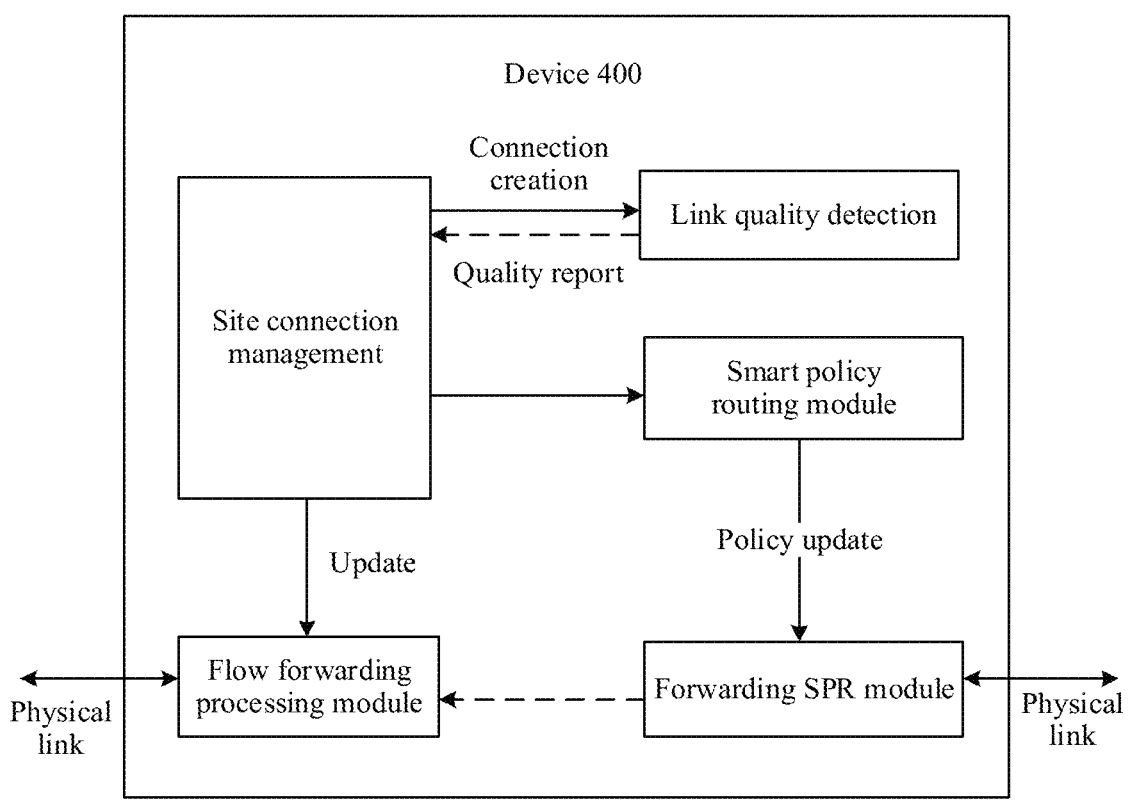
FIG. 4 is a schematic structural diagram of a device according to an embodiment of this application.

Based on FIG. 2, FIG. 4 is a possible schematic structural diagram of a device 400 to which an embodiment of this application is applicable.

Referring to FIG. 4, the device 400 may be any one of the device 110, the device 120, and the device 130 shown in FIG. 2. The device 400 may include a site connection management module, a link quality detection module, a smart policy routing (smart policy routing, SPR) module, a first forwarding module, and a second forwarding module.

The site connection management module is configured to: establish a link between the device 400 and another device; establish, based on information about a physical interface connected to a WAN side of the device 400, connection (hereinafter referred to as a link or a path) information between the device 400 and the another device connected to the device 400; then send the connection information to the first forwarding module; and notify the link quality detection module to detect quality of each path.

The link quality detection module is configured to detect quality of a path between the device 400 and the another device connected to the device 400. For example, the device 400 is connected to a device 410, and there are four paths between the device 400 and the device 410. In this case, the link quality detection module needs to detect quality of the four paths. Then, the link quality detection module sends a quality detection result of each path to the site connection management module.

The SPR module refreshes a path selection policy based on a link quality requirement of an application and service level agreement (service level agreement, SLA) information of a link. The SPR module stores a path selection policy that meets the link quality requirement, and deletes a path selection policy that does not meet the link quality requirement, for example, deletes a path selection policy that does not meet a condition for a delay or a packet loss, and then delivers the path selection policy that meets the link quality requirement to the second forwarding module. For example, the path selection policy is that, for an application corresponding to a voice service, an MPLS link is preferentially selected, and an internet (INET) link is secondly selected.

The first forwarding module is configured to receive a connection table delivered by the site connection management module, where the connection table includes specific paths corresponding to various applications. For example, an application to which a voice service belongs corresponds to an MPLS 1 link, an MPLS 2 link, or an INET link.

The second forwarding module is configured to receive policy update information delivered by the SPR module. For example, a policy 1 includes that an MPLS link is preferentially selected for an application to which a voice service belongs, and the policy 1 includes that an INET link is preferentially selected for an application to which a data service belongs.

After the device 400 receives a packet, the second forwarding module determines a policy corresponding to an application to which the packet belongs, and then the second forwarding module searches, based on the policy, the connection table for a specific path corresponding to the application to which the packet belongs.

It should be noted that any one of the device 110, the device 120, and the device 130 shown in FIG. 2 may include but is not limited to the modules shown in FIG. 4.

The following describes in detail the packet transmission method provided in the embodiments of this application.

Embodiment 1

Figure 5:
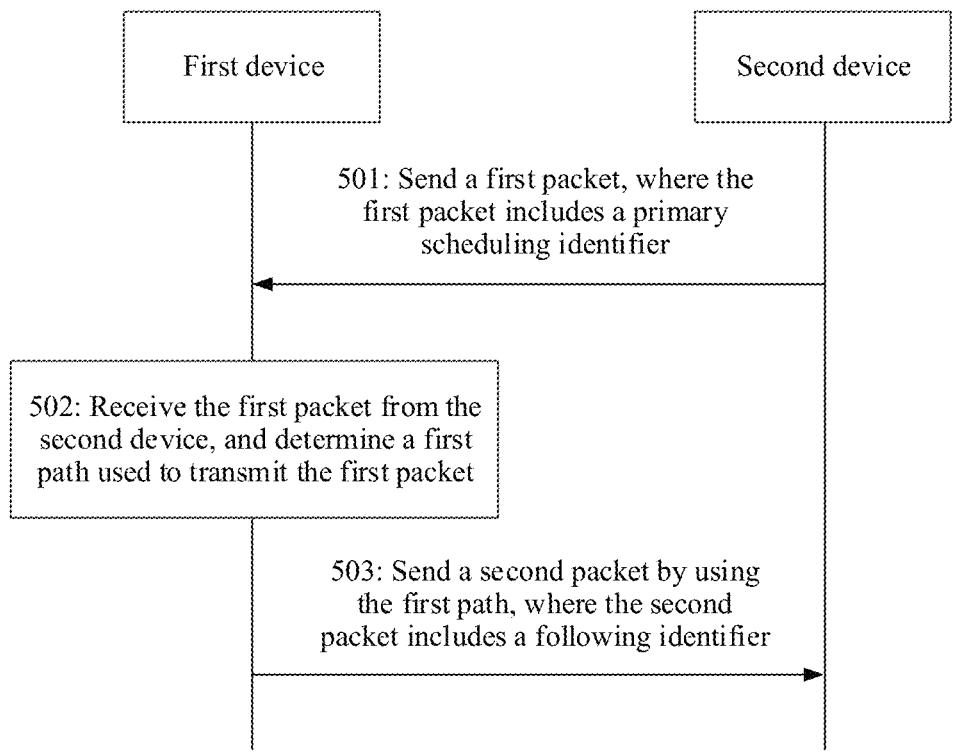
FIG. 5 is a schematic flowchart of a packet transmission method according to an embodiment of this application.

FIG. 5 is a schematic flowchart of a service flow processing method according to this application. As shown in FIG. 5, the method may include the following steps.

Step 501: A second device sends a first packet to a first device, where the first packet includes a primary scheduling identifier, and the primary scheduling identifier is used to identify that the second device has permission to select a path.

Step 502: The first device receives the first packet from the second device, and determines a first path used to transmit the first packet.

Step 503: The first device sends a second packet to the second device by using the first path, where the second packet includes a following identifier, and the following identifier is used to identify that the first device sends the packet by using a transmission path selected by a device other than the first device.

In this embodiment of this application, the second device serving as a primary scheduling party has the permission to select a path, and the first device serving as a following party may send the packet by using the transmission path selected by the device other than the first device. To be specific, when the second device communicates with the first device, the first device serving as the following party may send the packet by using the transmission path selected by the second device serving as the primary scheduling party, so that the first device and the second device send the packets by using the same transmission path. This can ensure that a same path is used for bidirectional packet transmission between two communication parties while ensuring service quality, even in a complex SD-WAN path selection scenario.

In this embodiment of this application, before step 501 is performed, the second device may first receive a primary-secondary selection policy delivered by a controller, and then determine, based on the primary-secondary selection policy, that in the first device and the second device that serve as communication peer ends, the second device has the permission to select a path, to be specific, the second device is the primary scheduling party, and the first device is the following party. It should be understood that, alternatively, the first device may receive a primary-secondary selection policy delivered by a controller, and then determine, based on the primary-secondary selection policy, that in the first device and the second device that serve as communication peer ends, the second device is the primary scheduling party, and the first device is the following party. Therefore, when the second device communicates with the first device, the second device selects the path used to send the packet, and adds the primary scheduling identifier to the sent packet. The first device sends the packet by using the path selected by the second device, and adds the secondary scheduling identifier to the sent packet.

Certainly, before step 501 is performed, alternatively, a transmit end of the first packet transmitted between the first device and the second device may determine which of the two communication parties has the permission to select a path. Then, the transmit end of the first packet adds a determined result to the sent first packet. It should be noted that the first packet in step 501 may be the first packet transmitted between the two communication parties, or may not be the first packet transmitted between the two communication parties. If the first packet is not the first packet transmitted between the two communication parties, it indicates that at least one packet is transmitted between the two communication parties before the first packet is transmitted.

For example, the first packet sent by the second device is the first packet transmitted between the two communication parties. Before sending the first packet, the second device only needs to determine, based on the primary-secondary selection policy, that the second device has the permission to select a path. Then, after receiving the first packet, the first device can determine, based on the primary scheduling identifier carried in the first packet, that the second device is the primary scheduling party, and the first device is the following party. Then, the first device can directly send the second packet by using the transmission path used for the first packet.

For example, before the second device sends the first packet, the first device has sent, to the second device, the first packet transmitted between the two devices (the first device and the second device). In this case, before sending the first packet, the first device first determines that the first device is the following party and the second device is the primary scheduling party, and then the first device adds the following identifier to the first packet. The second device receives the first packet, and determines that the first packet carries the following identifier. In this case, the second device can determine that the first device is the following party, and the second device is the primary scheduling party. Therefore, the second device may not consider which path is used by the first device to send the first packet, but autonomously selects the first path to send the first packet.

The primary-secondary selection policy mentioned in the foregoing content may include one or more of the following.

First policy: A device, in the first device and the second device, with a smaller link bandwidth has the permission to select a path. Based on the first policy, the device with a smaller link bandwidth may serve as the primary scheduling party to select a path. Therefore, which device is the primary scheduling party can be properly determined based on link bandwidths of the first device and the second device, so as to avoid a problem that congestion occurs for the device with a smaller link when a device with a larger link bandwidth selects a path.

Second policy: In the first device and the second device, a device serving as a branch router spoke has the permission to select a path, and a device serving as a hub has permission to follow the path selected by the device serving as the spoke. Based on the second policy, the device serving as the branch router spoke may serve as the primary scheduling party to select a path, so as to avoid a problem that when the device serving as the hub selects a path as the primary scheduling party, congestion occurs for the device serving as the branch router spoke.

Third policy: A correspondence between an identifier of the first device and scheduling permission and a correspondence between an identifier of the second device and scheduling permission are used. For example, the identifier of the first device is an ID 1 and the identifier of the second device is an ID 2. It is assumed that the third policy includes that a device corresponding to the ID 1 is the primary scheduling party and a device corresponding to the ID 2 is the following party. Based on this, it can be easily determined that the first device has the permission to select a path.

Fourth policy: A correspondence between a system IP address of the first device and scheduling permission and a correspondence between a system IP address of the second device and scheduling permission are used. For example, an identifier of the first device is a system IP address 10.10.10.14, and an identifier of the second device is a system IP address 10.10.12.16. It is assumed that the fourth policy includes that a device corresponding to the system IP address 10.10.10.14 is the primary scheduling party and a device corresponding to the system IP address 10.10.12.16 is the following party. Based on this, it can be easily determined that the first device has the permission to select a path.

It should be understood that the primary-secondary selection policy may include but is not limited to one of the foregoing four policies. When the primary-secondary selection policy includes a combination of a plurality of policies, results determined based on the plurality of policies may conflict. An example in which the primary-secondary selection policy includes the second policy, the third policy, and the fourth policy is used. Both a result determined based on the second policy and a result determined based on the fourth policy are that the first device has the permission to select a path, and a result determined based on the third policy is that the second device has the permission to select a path. In other words, the result determined based on the third policy conflicts with the results determined based on the second policy and the fourth policy. In this case, which result should be finally used cannot be determined.

To avoid such a case in which results determined based on a plurality of policies conflict, a priority sequence may be set for policies included in the primary-secondary selection policy. For example, the priority sequence is the first policy, the second policy, the fourth policy, and the third policy in descending order. The example in which the primary-secondary selection policy includes the second policy, the third policy, and the fourth policy is still used. Which device has the permission to select a path is first determined based on the second policy. For example, if which of the first device and the second device serves as the branch router spoke and which serves as the hub device cannot be determined, which device has the permission to select a path cannot be determined based on the second policy. Then, which device has the permission to select a path is determined based on the fourth policy. If which device has the permission to select a path can be determined based on the fourth policy, a result determined based on the fourth policy is used, with no need to determine, based on the third policy, which device has the permission to select a path. It should be noted that the priority sequence may be set based on a specific implementation scenario, and may change with a change of an implementation scenario. This is not limited herein.

In specific implementation of step 502, manners in which the first device determines the first path used to transmit the first packet may include but are not limited to any one of the following manners.

Manner 1: The first packet carries path information, and the first device obtains the path information through parsing from the first packet, and then determines a path corresponding to the path information, that is, the first path used to transmit the first packet.

Manner 2: A first correspondence is configured in the first device, and includes a correspondence between an interface identifier and path information. The first device may determine, based on the first correspondence and an interface identifier that is used to receive the first packet, path information corresponding to the interface identifier that is used to receive the first packet, and use a path corresponding to the determined path information as the first path used to transmit the first packet.

Optionally, the first path used to transmit the first packet is selected by the second device serving as the primary scheduling party. Further, the second device serving as the primary scheduling party may select the first path according to a path selection policy.

For example, there are two paths between the first device and the second device, and the two paths are an MPLS path and an internet path. The second device stores a path selection policy 1 and a path selection policy 2. The path selection policy 1 indicates that the MPLS path is preferentially selected for an application to which a voice service belongs, and the path selection policy 2 indicates that the internet path is preferentially selected for an application to which a data service belongs. If a telephone set A connected to the second device communicates with a telephone set B connected to the first device, because a voice service is transmitted between the telephone set A and the telephone set B, and high communication quality is required, the second device selects the path selection policy 1, that is, preferentially selects the MPLS path.

The second device serves as the primary scheduling party, and the first device serves as the following party. The first device may use a same transmission path or different transmission paths for receiving two packets sent by the second device. In an optional implementation, after step 503, the second device may further send a third packet to the first device, where the third packet includes the primary scheduling identifier. Descriptions are provided with reference to step 502 in which the first device receives the first packet. If a transmission path used for the third packet is different from the transmission path used for the first packet, when the first device serving as the following party needs to send a packet after receiving the third packet, the first device sends the next packet by using the transmission path used for the third packet.

In a possible implementation, the first device may determine a transmission path of a received packet each time the first device receives a packet from the second device, so that the first device sends a next packet by using the transmission path of the received packet after receiving the packet. This may be understood as follows: When the first device receives the first packet, the first device determines the transmission path used to transmit the first packet; and then, when the first device receives the third packet, the first device determines the transmission path used to transmit the third packet.

In another possible implementation, the first packet and the third packet each may further include a path version identifier, and the path version identifier is used to identify whether a path selected by a packet transmit end changes. If the first device determines that a path version identifier carried in the third packet is different from a path version identifier carried in the first packet, it may indicate that the second device reselects a transmission path before sending the third packet. In this case, the first device may determine a second path used to transmit the third packet, and then send a fourth packet to the second device by using the second path, where the fourth packet includes the following identifier.

It can be learned that, the first device serving as the following party receives the third packet from the second device after receiving the first packet from the second device, and may learn, by comparing the transmission path used for the first packet with the transmission path used for the third packet, whether the path selected by the second device serving as the primary scheduling party changes. By determining, through comparison, whether the path version identifiers respectively carried in the first packet and the third packet are the same, the first device can quickly determine whether the transmission path selected by the second device changes. If the path version identifiers respectively carried in the first packet and the third packet are different, it may indicate that the second device has reselected a path when sending the third packet. In this case, the first device serving as the following party also uses the new path selected by the second device, to send the fourth packet. In this way, when the second device serving as the primary scheduling party changes the transmission path, it can still be ensured that a same path is used for bidirectional packet transmission between the two communication parties. If the path version identifiers respectively carried in the first packet and the third packet are the same, it may indicate that the second device does not reselect a path when sending the third packet, and the first device may not need to determine the transmission path used for the third packet, but send the fourth packet still by using the path used for the first packet. In this way, a packet forwarding processing procedure can be accelerated.

In specific implementation, after sending the first packet and before sending the third packet, if the second device serving as the primary scheduling party determines that a path needs to be reselected, the second device sets the path version identifier carried in the third packet to a value that is different from a value of the path version identifier carried in the first packet. For example, a value of the path version identifier may be increased by 1 each time a path changes. In this way, the first device can determine, by comparing the value of the path version identifier in the received third packet with the value of the path version identifier in the received previous packet (the first packet), whether the path selected by the second device changes.

It should be noted that a value of a path version identifier carried when the second device serving as the primary scheduling party sends a packet is independent of a value of a path version identifier carried when the first device serving as the following party sends a packet. The following provides descriptions with reference to a specific example. For example, the two devices send packets in turn. A specific process may include the following steps:

Step 1: The second device sends the first packet between the two devices by using a path A, where a value of a path version identifier carried in the first packet is 3.

Step 2: After receiving the first packet, the first device sends the second packet between the two devices to the second device by using the path A, where a value of a path version identifier carried in the second packet is 2.

Step 3: After receiving the second packet between the two devices, the second device does not change the transmission path, and sends the third packet between the two devices to the first device still by using the path A, where a value of a path version identifier carried in the third packet is 3.

Step 4: After receiving the third packet, the first device does not change the transmission path, and sends the fourth packet between the two devices to the second device by using the path A, where a value of a path version identifier carried in the fourth packet is 2.

Step 5: After receiving the fourth packet between the two devices, the second device changes the transmission path, and sends the fifth packet between the two devices to the first device by using a path B, where a value of a path version identifier carried in the fifth packet is 4.

Step 6: After receiving the fifth packet, the first device also changes the transmission path, and sends the sixth packet between the two devices to the second device by using the path B, where a value of a path version identifier carried in the sixth packet is 3.

It should be understood that, when the second device changes the transmission path in step 5, the value of the path version identifier carried in the fifth packet changes based on the path version identifier carried in the third packet (that is, when the fifth packet is a current packet sent by the second device, the third packet is a previous packet of the current packet sent by the second device) sent by the second device in step 3. Correspondingly, when the first device changes the transmission path in step 6, the value of the path version identifier carried in the sixth packet changes based on the path version identifier carried in the fourth packet (that is, when the sixth packet is a current packet sent by the first device, the fourth packet is a previous packet of the current packet sent by the first device) sent by the first device in step 4.

It should be noted that a packet other than the first packet and the third packet may also carry a path version identifier. For example, each of the first packet, the fourth packet, and a packet subsequently transmitted between the first device and the second device in this embodiment of this application may also carry a path version identifier.

In a communication process between the first device and the second device, congestion may occur for one or both of the first device and the second device. In this case, link quality is reduced, and user experience is affected. A device whose path is congested may add a forward congestion back pressure identifier and/or a backward congestion back pressure identifier to a packet to notify the other device of the congestion in a timely manner. The forward congestion back pressure identifier indicates whether a path in a sending direction of the device is congested, and the backward congestion back pressure identifier indicates whether a path in a receiving direction of the device is congested.

In a possible implementation, in addition to the following identifier, the second packet may further include a backward congestion back pressure identifier. After receiving the first packet from the second device in step 502, the first device may further determine whether a path in a receiving direction of the first device is congested; and if the path in the receiving direction of the first device is congested, set the backward congestion back pressure identifier included in the second packet to a first value, or if the path in the receiving direction of the first device is not congested, set the backward congestion back pressure identifier included in the second packet to a second value. Therefore, by adding the backward congestion back pressure identifier to the sent second packet, the first device can notify, in a timely manner, the second device whether the receiving direction of the first device is congested.

In another possible implementation, in addition to the following identifier, the second packet may further include a forward congestion back pressure identifier. Before step 503, the first device may further determine whether a path in a sending direction of the first device is congested; and if the path in the sending direction of the first device is congested, set the forward congestion back pressure identifier included in the second packet to the first value, or if the path in the sending direction of the first device is not congested, set the forward congestion back pressure identifier included in the second packet to the second value. In this way, by adding the forward congestion back pressure identifier to the sent second packet, the first device can notify, in a timely manner, the second device whether the sending direction of the first device is congested.

It should be noted that, if congestion occurs in only the receiving direction of the first device, the second packet may carry only the backward congestion back pressure identifier, or may carry both the backward congestion back pressure identifier and the forward congestion back pressure identifier. If both the two identifiers are carried, the backward congestion back pressure identifier needs to be set to the first value, and the forward congestion back pressure identifier needs to be set to the second value. If congestion occurs in only the sending direction of the first device, the second packet may carry only the forward congestion back pressure identifier, or may carry both the backward congestion back pressure identifier and the forward congestion back pressure identifier. If both the identifiers are carried, the forward congestion back pressure identifier needs to be set to the first value, and the backward congestion back pressure identifier needs to be set to the second value. If congestion occurs in both the sending direction and the receiving direction of the first device, the second packet may carry both the backward congestion back pressure identifier and the forward congestion back pressure identifier, where both the forward congestion back pressure identifier and the backward congestion back pressure identifier are set to the first value.

It should be understood that any packet transmitted between the first device and the second device may carry the backward congestion back pressure identifier and/or the forward congestion back pressure identifier. In specific implementation, whether the packet carries either or both of the two identifiers depends on a specific situation, and is not limited herein.

In this embodiment of this application, the four added identifiers, that is, the primary scheduling identifier or the following identifier, the path version identifier, the backward congestion back pressure identifier, and the forward congestion back pressure identifier, may be carried in a packet in two manners. The primary scheduling identifier or the following identifier occupies one bit, the backward congestion back pressure identifier occupies one bit, the forward congestion back pressure identifier occupies one bit, and the path version identifier occupies four bits.

In specific implementation, a packet includes at least the primary scheduling identifier or the following identifier, and may or may not carry the path version identifier, the backward congestion back pressure identifier, and the forward congestion back pressure identifier. This may be understood as follows: A packet may carry the foregoing four added identifiers, or may carry only some of the foregoing four identifiers. The following provides descriptions by using an example in which a packet carries the foregoing four added identifiers.

Figure 6:
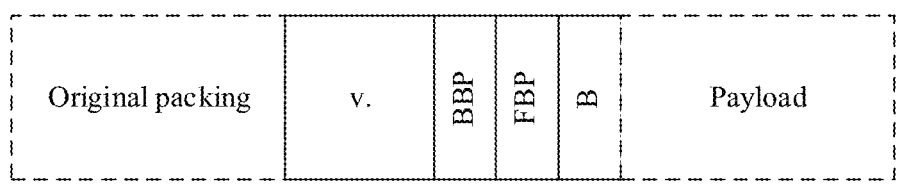
FIG. 6 is a schematic diagram of a packet encapsulation format according to an embodiment of this application.

The four identifiers may be carried in the packet in a plurality of optional manners. In this embodiment, only two possible carrying manners are used as examples. In a manner, as shown in FIG. 6, in a tunnel encapsulation process of an overlay (Overlay) connection, for example, generic routing encapsulation (GRE) extension encapsulation, the foregoing four identifiers are added by adding an extended encapsulation field. Seven bits may be added before a payload (payload) in a data packet in the prior art to add the foregoing four identifiers. As shown in FIG. 6, an added field V. indicates a path version identifier, version; BBP represents a backward congestion back pressure identifier, back congestion bit pressure; FBP represents a forward congestion back pressure identifier, forwarding congestion bit pressure; and B represents an ownership identifier, and may be a primary scheduling identifier or a following identifier.

Figure 7:
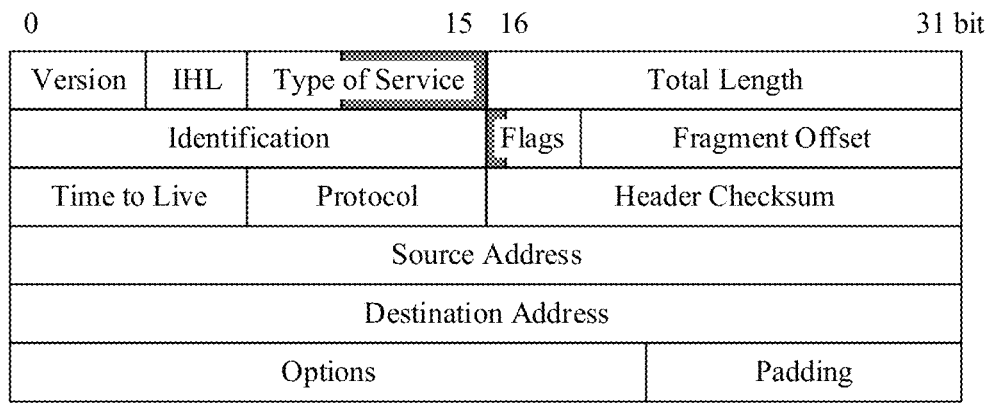
FIG. 7 is a schematic diagram of another packet encapsulation format according to an embodiment of this application.

In another manner, for a scenario without overlay encapsulation or a scenario in which an intermediate device does not support tunnel extension encapsulation, reference may be made to FIG. 7. A reserved field (for example, flags in FIG. 7, with one available bit) or an uncommon field (for example, type of service in FIG. 7, with two available bits) in an IP header or an IP header of an internal packet of a tunnel is used to carry the foregoing four added identifiers. A reserved field in the prior art does not include any information. If a total quantity of bits of the reserved field or the uncommon field is insufficient to encapsulate the foregoing four added identifiers, only the primary scheduling identifier or the following identifier and either or both of the backward congestion back pressure identifier and the forward congestion back pressure identifier may be encapsulated.

Embodiment 2

Figure 8:
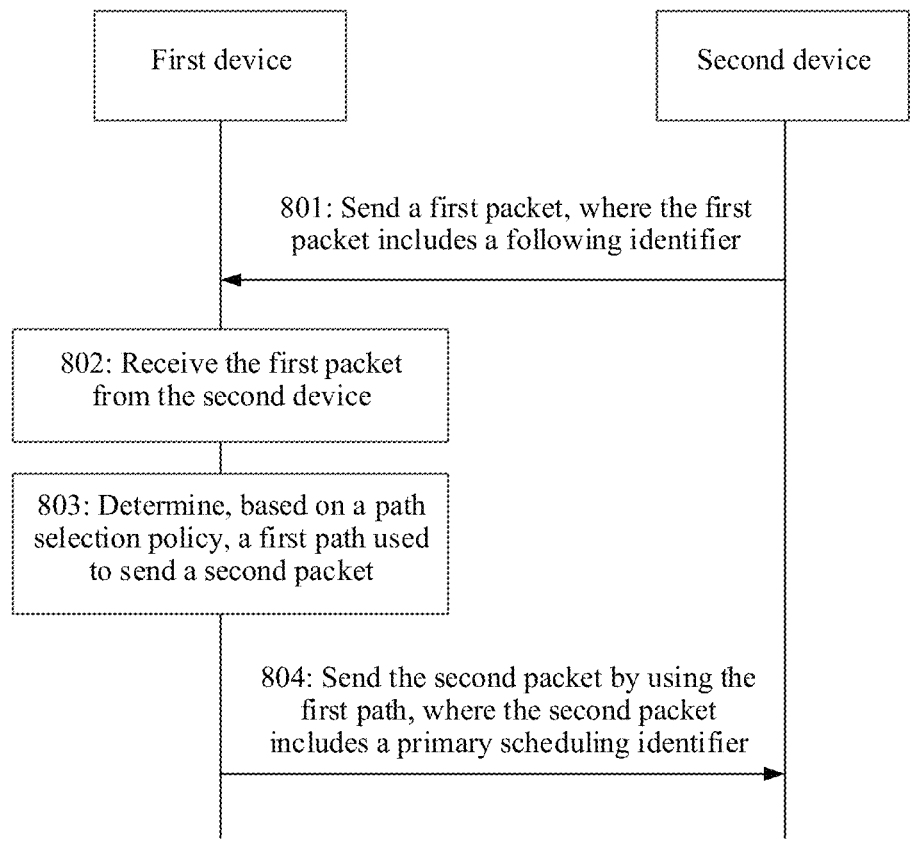
FIG. 8 is a schematic flowchart of another packet transmission method according to an embodiment of this application.

FIG. 8 is a schematic flowchart of another service flow processing method according to this application. As shown in FIG. 8, the method may include the following steps.

Step 801: A second device sends a first packet to a first device, where the first packet includes a following identifier, and the following identifier is used to identify that the second device sends the packet by using a transmission path selected by a device other than the second device.

Step 802: The first device receives the first packet from the second device.

Step 803: The first device determines, based on a path selection policy, a first path used to send a second packet.

Step 804: The first device sends the second packet to the second device by using the first path, where the second packet includes a primary scheduling identifier, and the primary scheduling identifier is used to identify that the first device has permission to select a path.

In this embodiment of this application, the first device serving as a primary scheduling party has the permission to select a path, and the second device serving as a following party may send the packet by using the transmission path selected by the device other than the second device. When the first device receives the first packet from the second device, the first device selects, according to the path selection policy, the transmission path to send the second packet, instead of sending the second packet by using the transmission path used for the first packet. To be specific, when the second device communicates with the first device, the first device serving as the primary scheduling party sends the packet by using the transmission path selected by the first device, and the second device serving as the following party may send a packet by using the transmission path selected by the first device serving as the primary scheduling party, so that the first device and the second device send the packets by using the same transmission path. This can ensure that a same path is used for bidirectional packet transmission between two communication parties while ensuring service quality, even in a complex SD-WAN path selection scenario.

In this embodiment of this application, before step 801 is performed, the second device may first receive a primary-secondary selection policy delivered by a controller, and then determine, based on the primary-secondary selection policy, that in the first device and the second device that serve as communication peer ends, the first device has the permission to select a path, to be specific, the first device is the primary scheduling party, and the second device is the following party. It should be understood that, alternatively, the first device may receive a primary-secondary selection policy delivered by a controller, and then determine, based on the primary-secondary selection policy, that in the first device and the second device that serve as communication peer ends, the first device is the primary scheduling party, and the second device is the following party. Therefore, when the first device communicates with the second device, the first device selects a path used to send a packet, and adds the primary scheduling identifier to the sent packet. The second device sends a packet by using the path selected by the first device, and adds the secondary scheduling identifier to the sent packet.

Certainly, before step 801 is performed, a transmit end of the first packet transmitted between the first device and the second device may determine which of the two communication parties has the permission to select a path. Then, the transmit end of the first packet adds a determined result to the sent first packet. This may be understood as follows: If the first packet in step 801 is the first packet transmitted between the first device and the second device, the second device may determine which device is the primary scheduling party and which device is the following party. Then, after receiving the first packet carrying the following identifier, the first device can learn that the second device is the following party, and therefore determine that the first device is the primary scheduling party. In this case, the first device adds the primary scheduling identifier to a subsequently sent second packet.

The primary-secondary selection policy may include one or more of the following: a first policy: a device, in the first device and the second device, with a smaller link bandwidth has the permission to select a path; a second policy: in the first device and the second device, a device serving as a branch router spoke has the permission to select a path, and a device serving as a hub has permission to follow the path selected by the device serving as the spoke; a third policy: a correspondence between an identifier of the first device and scheduling permission and a correspondence between an identifier of the second device and scheduling permission; and a fourth policy: a correspondence between a system IP address of the first device and scheduling permission and a correspondence between a system IP address of the second device and scheduling permission. It should be understood that the primary-secondary selection policy may include but is not limited to the foregoing four policies. In this embodiment of this application, for specific content of the primary-secondary selection policy, reference may be made to descriptions of related content in Embodiment 1. Details are not described herein.

In this embodiment of this application, in step 804, the first device serving as the primary scheduling party sends the second packet by using the first path. After receiving the second packet that carries the primary scheduling identifier, the second device serving as the following party also uses the first path to send a next packet, after determining the first path used to transmit the second packet. To be specific, the second device sends a third packet to the first device, where the third packet includes the following identifier, and a transmission path of the third packet is the first path. Correspondingly, the first device may receive the third packet from the second device. In this way, the second device serving as the following party sends the packet by using the transmission path selected by the first device serving as the primary scheduling party. This can effectively ensure that a same path is used for bidirectional packet transmission between two communication parties.

In a communication process between the first device and the second device, congestion may occur for one or both of the first device and the second device. In this case, link quality is reduced, and user experience is affected. A device whose path is congested may add a forward congestion back pressure identifier and/or a backward congestion back pressure identifier to a packet to notify the other device of the congestion in a timely manner. The forward congestion back pressure identifier indicates whether a path in a sending direction of the device is congested, and the backward congestion back pressure identifier indicates whether a path in a receiving direction of the device is congested.

In a possible implementation, in addition to the following identifier, the first packet may further include a forward congestion back pressure identifier and/or a backward congestion back pressure identifier. After step 803, if the first packet meets a preset condition, and neither a path in a receiving direction of the first device nor a path in a sending direction of the first device is congested, the first device waive the permission to select a path. The preset condition includes: the forward congestion back pressure identifier included in the first packet is a first value, and/or the backward congestion back pressure identifier included in the first packet is the first value, where the first value is used to indicate that congestion occurs. Then, the first device sends a fourth packet to the second device by using the first path, where the fourth packet includes the following identifier, both a forward congestion back pressure identifier and a backward congestion back pressure identifier carried in the fourth packet are a second value, and the second value is used to indicate that no congestion occurs.

After the first device serving as the primary scheduling party receives the first packet from the second device, if the first packet includes the forward congestion back pressure identifier, the first device may determine, based on a value of the forward congestion back pressure identifier included in the first packet, whether a path in a sending direction of the second device is congested; or if the first packet includes the backward congestion back pressure identifier, the first device may determine, based on a value of the backward congestion back pressure identifier included in the first packet, whether a path in a receiving direction of the second device is congested. Further, when neither the path in the receiving direction of the first device nor the path in the sending direction of the first device is congested, and a path in at least one direction of the second device is congested, the first device waives the permission to select a path, and notifies the second device by adding the following identifier to the subsequently sent fourth packet, so that the second device can learn that the first device has waived the permission to select a path, and the second device can obtain the permission to select a path. In this way, the second device whose path is congested can select a path to transmit a packet, so that continuous congestion can be avoided for the second device.

Further, after the first device sends the fourth packet to the second device by using the first path, the second device may determine, based on the following identifier in the fourth packet, that the first device waives the permission to select a path. In this case, the second device sends a fifth packet to the first device, where the fifth packet includes a primary scheduling identifier, and a transmission path of the fifth packet is a fourth path selected by the second device according to the path selection policy. The second device can notify, by adding the primary scheduling identifier to the fifth packet, the first device that the second device becomes the primary scheduling party, that is, the second device has the permission to select a path. Correspondingly, the first device receives the fifth packet from the second device. After determining that the second device becomes the primary scheduling party, the first device may serve as the following party to send a packet by using the transmission path selected by the second device. In this way, the second device whose path is congested selects the transmission path, so that continuous congestion can be avoided for the second device.

In another possible implementation, after step 803, if the first packet meets a preset condition, and a path in at least one of a receiving direction and a sending direction of the first device is congested, the first device does not waive the permission to select a path. This may be understood as follows: If a path in at least one of a receiving direction and a sending direction of the second device is congested, and a path in at least one of the receiving direction and the sending direction of the first device is congested, the first device still reserves the permission to select a path. This can avoid a problem that when the first device waives the permission to select a path, the second device may still select a path that causes congestion in a direction of the first device.

To quickly determine whether a path used by a communication peer end changes, this embodiment of this application provides a possible implementation. The first packet and the second packet each further include a path version identifier, and the path version identifier is used to identify whether a path selected by a packet transmit end changes. After step 802 and before step 803, if the first device determines to reselect a transmission path used to send the packet, the first device sets a path version identifier included in the second packet to a third value, where the third value is used to indicate that the path selected by the first device changes; or if the first device determines not to change a transmission path used to send the packet, the first device sets a path version identifier included in the second packet to a fourth value, where the fourth value is used to indicate that the path selected by the first device does not change. In this way, after sending the first packet, if the first device serving as the primary scheduling party needs to reselect a transmission path used to send the packet, the first device may add, to the second packet, a path version identifier whose value is different from a value corresponding to the first packet, so that the second device can learn, in a timely manner, that the transmission path selected by the first device changes, or may add, to the second packet, a path version identifier whose value is the same as a value corresponding to the first packet, so that the second device can learn, in a timely manner, that the transmission path selected by the first device does not change.

It should be understood that any packet transmitted between the first device and the second device may carry the backward congestion back pressure identifier and/or the forward congestion back pressure identifier. In specific implementation, whether the packet carries either or both of the two identifiers depends on a specific situation, and is not limited herein.

In this embodiment of this application, the four added identifiers, that is, the primary scheduling identifier or the following identifier, the path version identifier, the backward congestion back pressure identifier, and the forward congestion back pressure identifier, may be carried in a packet in two manners. The primary scheduling identifier or the following identifier occupies one bit, the backward congestion back pressure identifier occupies one bit, the forward congestion back pressure identifier occupies one bit, and the path version identifier occupies four bits.

In specific implementation, a packet includes at least the primary scheduling identifier or the following identifier, and may or may not carry the path version identifier, the backward congestion back pressure identifier, and the forward congestion back pressure identifier. This may be understood as follows: The packet may carry the foregoing four added identifiers, or may carry only some of the foregoing four identifiers.

In this embodiment of this application, for related content of the four added identifiers, reference may be made to related descriptions in Embodiment 1. Details are not described herein.

Figure 9A:
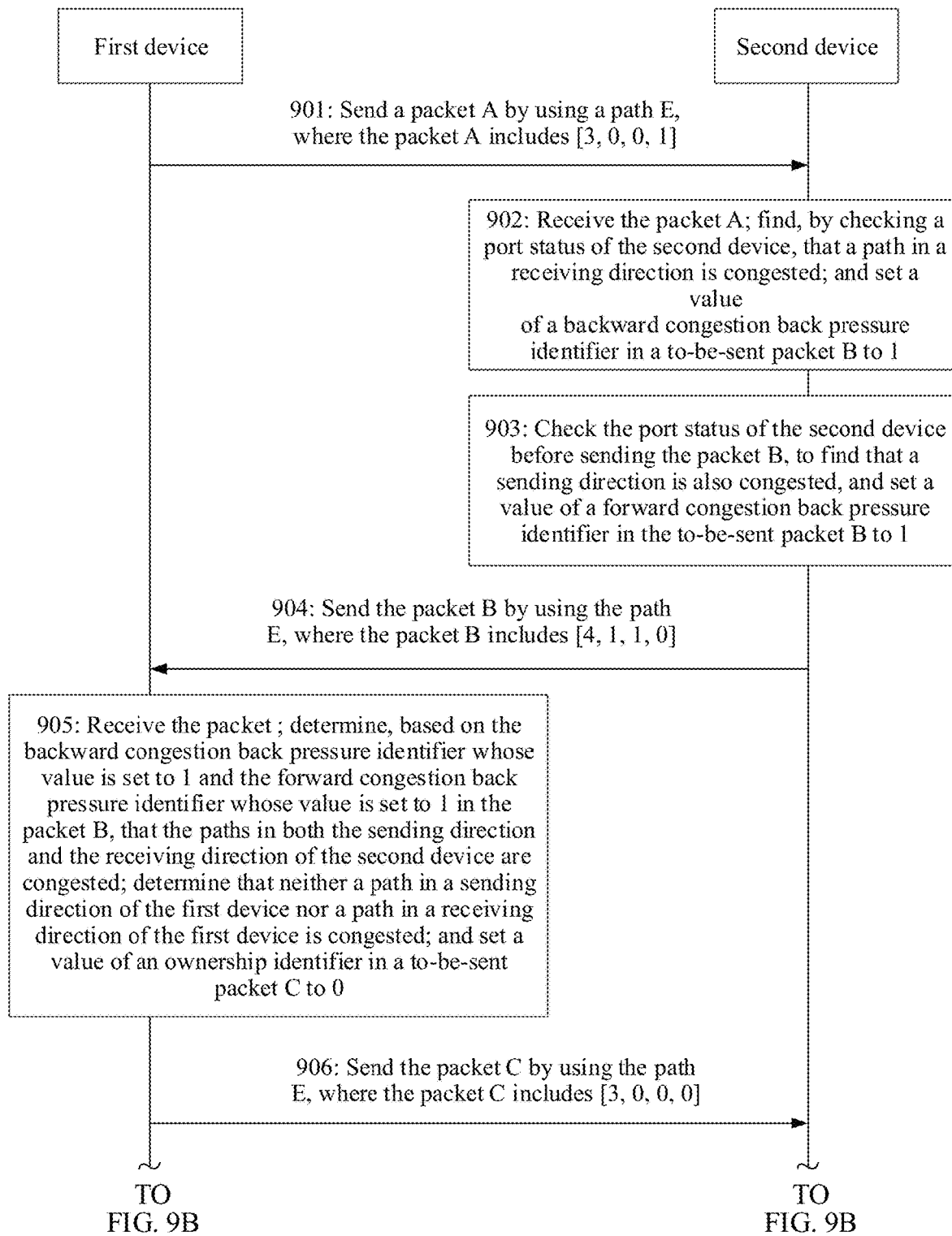
FIG. 9A and FIG. 9B are a schematic flowchart of another packet transmission method according to an embodiment of this application.
Figure 9B:
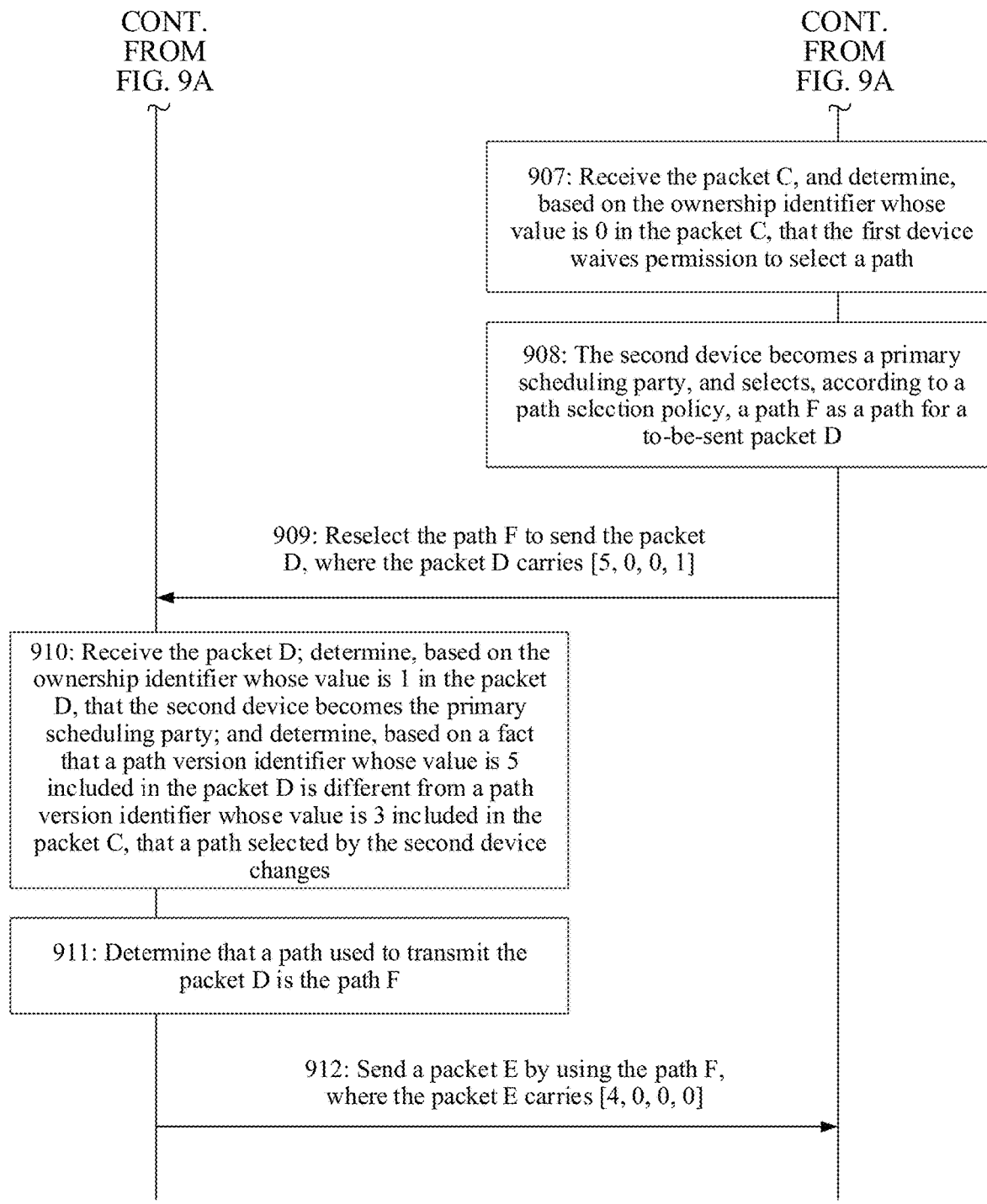

The following describes in detail a possible implementation of the foregoing packet transmission method with reference to FIG. 9A and FIG. 9B.

FIG. 9A and FIG. 9B are a schematic flowchart of an example of another packet transmission method according to an embodiment of this application. In the method, a first device serves as a primary scheduling party, and a second device serves as a following party. Content carried in a packet transmitted between the two devices may be indicated as [a path version identifier, a backward congestion back pressure identifier, a forward congestion back pressure identifier, and an ownership identifier], where the ownership identifier is a primary scheduling identifier or a following identifier. The method includes the following steps.

Step 901: The first device sends a packet A to the second device by using a path E, where the packet A includes [3, 0, 0, 1], an initial value of a path version identifier carried in the packet A is set to 3, a value of a backward congestion back pressure identifier and a value of a forward congestion back pressure identifier are both set to 0, indicating that neither a path in a sending direction nor a path in a receiving direction of the first device is congested, and an ownership identifier whose value is 1 represents the primary scheduling identifier.

Step 902: The second device receives the packet A; finds, by checking a port status of the second device, that a path in a receiving direction is congested; and sets a value of a backward congestion back pressure identifier in a to-be-sent packet B to 1.

Step 903: The second device checks the port status of the second device before sending the packet B, to find that a sending direction is also congested, and sets a value of a forward congestion back pressure identifier in the to-be-sent packet B to 1.

Step 904: The second device sends the packet B to the first device by using the path E, where the packet B includes [4, 1, 1, 0], an initial value of a path version identifier carried in the packet B is set to 4, the value of the backward congestion back pressure identifier and the value of the forward congestion back pressure identifier are both set to 1, indicating that paths in both the sending direction and the receiving direction of the second device are congested, and an ownership identifier whose value is 0 represents the following identifier.

Step 905: The first device receives the packet B sent by the second device, determines, based on the backward congestion back pressure identifier whose value is set to 1 and the forward congestion back pressure identifier whose value is set to 1 in the packet B, that the paths in both the sending direction and the receiving direction of the second device are congested; determines that neither the path in the sending direction nor the path in the receiving direction of the first device is congested; and sets a value of an ownership identifier in a to-be-sent packet C to 0.

Step 906: The first device sends the packet C to the second device by using the path E, where the packet C includes [3, 0, 0, 0], a value of a path version identifier carried in the packet C is still 3, a value of a backward congestion back pressure identifier and a value of a forward congestion back pressure identifier are both set to 0, indicating that neither the path in the sending direction nor the path in the receiving direction of the first device is congested, and an ownership identifier whose value is 0 represents the following identifier.

Step 907: The second device receives the packet C, and determines, based on the ownership identifier whose value is 0 in the packet C, that the first device waives permission to select a path.

Step 908: The second device becomes the primary scheduling party, and selects, according to a path selection policy, a path F as a path for a to-be-sent packet D.

Step 909: The second device reselects the path F to send the packet D, where the packet D carries [5, 0, 0, 1], a value of a path version identifier carried in the packet D is 5, a value of a backward congestion back pressure identifier and a value of a forward congestion back pressure identifier are both set to 0, indicating that neither the path in the sending direction of the second device nor the path in the receiving direction of the second device is congested, and an ownership identifier whose value is 1 represents the primary scheduling identifier.

Step 910: The first device receives the packet D; determines, based on the ownership identifier whose value is 1 in the packet D, that the second device becomes the primary scheduling party; and determines, based on a fact that the path version identifier whose value is 5 included in the packet D is different from the path version identifier whose value is 3 included in the packet C, that the path selected by the second device changes.

Step 911: The first device determines that a path used to transmit the packet D is the path F.

Step 912: The first device sends a packet E to the second device by using the path F, where the packet E carries [4, 0, 0, 0], a value of a path version identifier carried in the packet E is 4, a value of a backward congestion back pressure identifier and a value of a forward congestion back pressure identifier are both set to 0, indicating that neither the path in the sending direction of the first device nor the path in the receiving direction of the first device is congested, and an ownership identifier whose value is 0 represents the following identifier.

Figure 10:
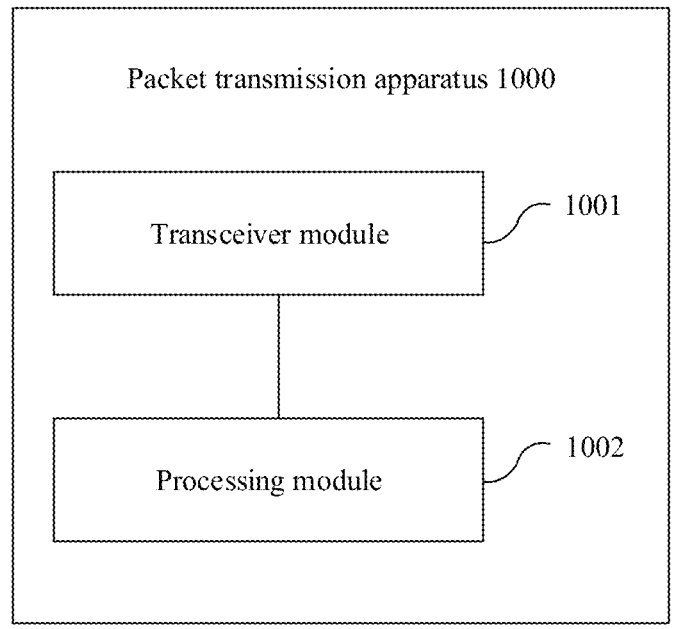
FIG. 10 is a schematic structural diagram of a packet transmission apparatus according to an embodiment of this application.

Based on a same inventive concept, the embodiments of this application further provide a packet transmission apparatus. FIG. 10 is a schematic structural diagram of a packet transmission apparatus according to an embodiment of this application. As shown in FIG. 10, the packet transmission apparatus 1000 includes a transceiver module 1001 and a processing module 1002.

The transceiver module 1001 is configured to support the apparatus 1000 in communicating with another device or apparatus (for example, a second device or a controller). The processing module 1002 is configured to control and manage an action of the apparatus 1000. The apparatus 1000 may further include a storage module 1003 configured to store program code and data of the apparatus 1000.

In a possible design, the transceiver module 1001 is configured to receive a first packet from the second device, where the first packet includes a primary scheduling identifier, and the primary scheduling identifier is used to identify that the second device has permission to select a path. The processing module 1002 is configured to determine a first path used to transmit the first packet. The transceiver module 1001 is further configured to send a second packet to the second device by using the first path, where the second packet includes a following identifier, and the following identifier is used to identify that the apparatus sends the packet by using a transmission path selected by a device other than the apparatus.

In another possible design, the transceiver module 1001 is configured to receive a first packet from the second device, where the first packet includes a primary scheduling identifier, and the primary scheduling identifier is used to identify that the second device has permission to select a path. The processing module 1002 is configured to determine a first path used to transmit the first packet. The transceiver module 1001 is further configured to send a second packet to the second device by using the first path, where the second packet includes a following identifier, and the following identifier is used to identify that the apparatus sends the packet by using a transmission path selected by a device other than the apparatus.

Division into the modules in this embodiment of this application is an example, is merely logical function division, and may be other division in actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 11:
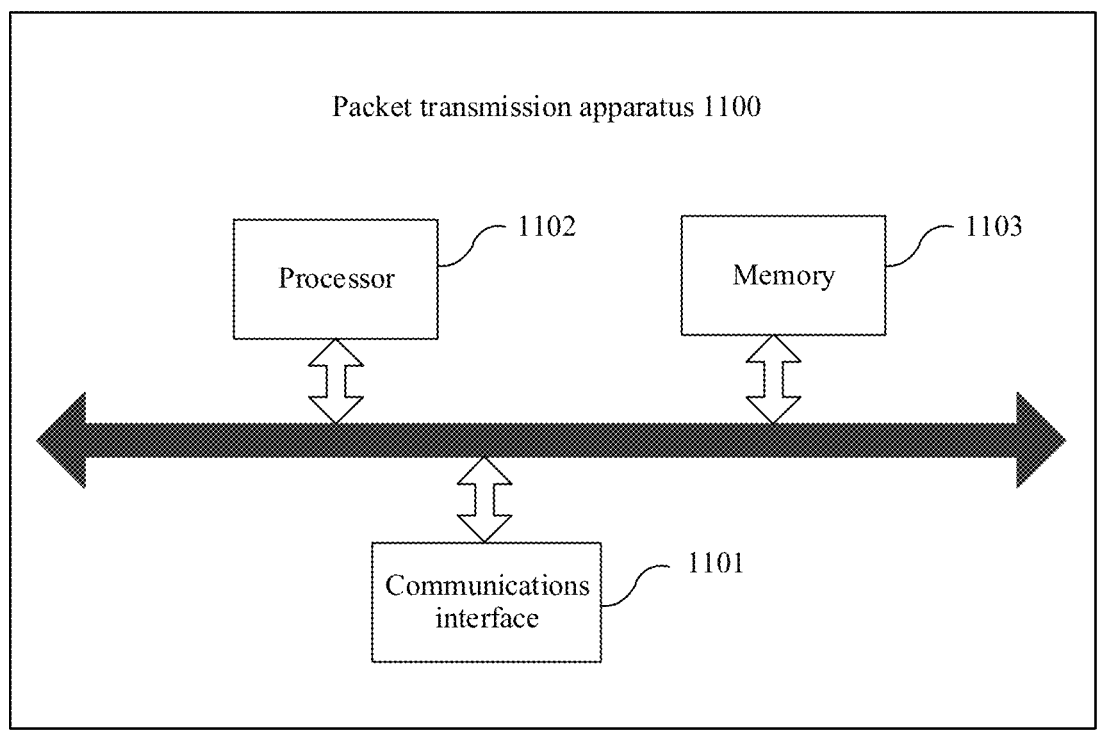
FIG. 11 is a schematic structural diagram of another packet transmission apparatus according to an embodiment of this application.

When the integrated module may be implemented in the form of hardware, as shown in FIG. 11, a packet transmission apparatus may include a processor 1102. Physical hardware corresponding to the module may be the processor 1102. The processor 1102 may be a central processing unit (CPU), a digital processing module, or the like. The packet transmission apparatus may further include a communications interface 1101, and the processor 1102 receives and sends a packet through the communications interface 1101. The apparatus further includes a memory 1103, configured to store a program executed by the processor 1102. The memory 1103 may be a non-volatile memory, for example, a hard disk drive (HDD) or a solid-state drive (SSD), or may be a volatile memory, for example, a random-access memory (RAM). The memory 113 is any other medium that can be configured to carry or store expected program code in a form of an instruction or a data structure and that is accessible to a computer, but is not limited thereto.

The processor 1102 is configured to execute the program code stored in the memory 1103, and is configured to perform the method in the embodiment shown in FIG. 5, or perform the method in the embodiment shown in FIG. 8. Details are not described herein in this application.

A specific connection medium between the communications interface 1101, the processor 1102, and the memory 1103 is not limited in this embodiment of this application. In this embodiment of this application, in FIG. 11, the memory 1103, the processor 1102, and the communications interface 1101 are connected by using a bus 1104, where the bus is represented by a thick line in FIG. 11. A connection manner between other components is merely schematically described, and is not limited herein. The bus may be classified into an address bus, a data bus, a control bus, and the like. For ease of representation, only one thick line is used to represent the bus in FIG. 11, but this does not mean that there is only one bus or only one type of bus.

An embodiment of the present application further provides a computer-readable storage medium configured to store a computer software instruction that needs to be executed for execution of the foregoing processor, and the instruction includes a program that needs to be executed for execution of the foregoing processor.

An embodiment of this application provides a computer program product including an instruction. When the computer program product is run on a computer, the computer is enabled to perform the packet transmission method in FIG. 5, FIG. 8, or FIG. 9A and FIG. 9B.

An embodiment of this application provides a chip system. The chip system includes a processor, configured to support a packet transmission apparatus in implementing a function in the packet transmission method in FIG. 5, FIG. 8, or FIG. 9A and FIG. 9B. In a possible design, the chip system further includes a memory, configured to store a program instruction and data that are necessary for the packet transmission apparatus. The chip system may include a chip, or may include a chip and another discrete component.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that these modifications and variations fall within the scope of the claims of this application and equivalent technologies thereof.

The invention claimed is:

1. A packet transmission method, comprising:
   determining, by a first device, which out of the first device and a second device is serving as a primary scheduling party which has permission to select a path for communication between the first and second devices, wherein the determining comprises: receiving, by the first device, a first packet from the second device via a first path, wherein the first packet comprises a primary scheduling identifier indicating that the second device is serving as the primary scheduling party which has permission to select the path for communication between the first and second devices; and
   based on determining that the second device is serving as the primary scheduling party, adding, by the first device, a following identifier to a second packet, and sending, by the first device, the second packet having the following identifier to the second device using the first path, wherein the following identifier indicates that the first device is a following party which uses a transmission path selected by a device other than the first device.

2. The method according to claim 1, wherein the first packet further comprises a path version identifier, wherein the path version identifier indicates whether a path selected by a packet transmit end has changed; and wherein after sending the second packet to the second device, the method further comprises:
   receiving, by the first device, a third packet from the second device, wherein the third packet comprises the primary scheduling identifier and a path version identifier;
   based on the first device determining that the path version identifier carried in the third packet is different from the path version identifier carried in the first packet, determining, by the first device, a second path used to transmit the third packet from the second device to the first device; and
   sending, by the first device, a fourth packet to the second device using the second path, wherein the fourth packet comprises the following identifier.

3. The method according to claim 1, further comprising:
obtaining, by the first device, the first path by parsing the first packet; or
determining, by the first device based on a first correspondence and an interface identifier of an interface used to receive the first packet, path information corresponding to the interface identifier, and setting a path corresponding to the determined path information as the first path, wherein the first correspondence comprises a correspondence between the interface identifier and the path information.

4. The method according to claim 1, wherein the second packet further comprises a backward congestion back pressure identifier; and
wherein after receiving the first packet from the second device, the method further comprises:
   determining, by the first device, whether a path in a receiving direction of the first device is congested; and
   based on the path in the receiving direction of the first device being congested, setting the backward congestion back pressure identifier comprised in the second packet to a first value, or based on the path in the receiving direction of the first device not being congested, setting the backward congestion back pressure identifier comprised in the second packet to a second value.

5. The method according to claim 1, wherein the second packet further comprises a forward congestion back pressure identifier; and
wherein before sending the second packet to the second device, the method further comprises:
   determining, by the first device, whether a path in a sending direction of the first device is congested; and
   based on the path in the sending direction of the first device being congested, setting the forward congestion back pressure identifier comprised in the second packet to a first value, or based on the path in the sending direction of the first device not being congested, setting the forward congestion back pressure identifier comprised in the second packet to a second value.

6. A first device, wherein the first device comprises:
a memory configured to store instructions; and
a processor coupled to the memory and configured to execute the instructions to facilitate the following being performed by the first device:
   determining which out of the first device and a second device is serving as a primary scheduling party which has permission to select a path for communication between the first and second devices, wherein the determining comprises: receiving a first packet from the second device via a first path, wherein the first packet comprises a primary scheduling identifier indicating that the second device is serving as the primary scheduling party which has permission to select the path for communication between the first and second devices; and
   based on determining that the second device is serving as the primary scheduling party, adding a following identifier to a second packet, and sending the second packet having the following identifier to the second device using the first path, wherein the following identifier indicates that the first device is a following party which uses a transmission path selected by a device other than the first device.

7. The first device according to claim 6, wherein the first packet further comprises a path version identifier, wherein the path version identifier indicates whether a path selected by a packet transmit end has changed; and
wherein the processor is further configured to execute the instructions to facilitate the following being performed by the first device:
   after sending the second packet to the second device, receiving a third packet from the second device, wherein the third packet comprises the primary scheduling identifier and a path version identifier;
   based on determining that the path version identifier carried in the third packet is different from the path version identifier carried in the first packet, determining a second path used to transmit the third packet from the second device to the first device; and
   sending a fourth packet to the second device using the second path, wherein the fourth packet comprises the following identifier.

8. The first device according to claim 6, wherein the processor is further configured to execute the instructions to facilitate the following being performed by the first device:
obtaining the first path through parsing from the first packet; or
determining, based on a first correspondence and an interface identifier used to receive the first packet, path information corresponding to the interface identifier, and using a path corresponding to the determined path information as the first path, wherein the first correspondence comprises a correspondence between the interface identifier and the path information.

9. The first device according to claim 6, wherein the second packet further comprises a backward congestion back pressure identifier; and
wherein the processor is further configured to execute the instructions to facilitate the following being performed by the first device:
   after receiving the first packet from the second device, determining whether a path in a receiving direction of the first device is congested; and
   based on the path in the receiving direction of the first device being congested, setting the backward congestion back pressure identifier comprised in the second packet to a first value, or based on the path in the receiving direction of the first device not being congested, setting the backward congestion back pressure identifier comprised in the second packet to a second value.

10. The first device according to claim 6, wherein the second packet further comprises a forward congestion back pressure identifier; and wherein the processor is further configured to execute the instructions to facilitate the following being performed by the first device:

before sending the second packet to the second device using the first path, determining whether a path in a sending direction of the first device is congested; and based on the path in the sending direction of the first device being congested, setting the forward congestion back pressure identifier comprised in the second packet to a first value, or based on the path in the receiving direction of the first device not being congested, setting the forward congestion back pressure identifier comprised in the second packet to a second value.

* * * * *